(12) United States Patent
Jacobs

(10) Patent No.: US 9,272,893 B2
(45) Date of Patent: Mar. 1, 2016

(54) MULTI-VALVE LIQUID FLOW CONTROL FOR LIQUID SUPPLY

(71) Applicant: Keurig, Incorporated, Reading, MA (US)

(72) Inventor: William T. Jacobs, Lynnfield, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 160 days.

(21) Appl. No.: 13/795,686

(22) Filed: Mar. 12, 2013

(65) Prior Publication Data

US 2014/0263397 A1 Sep. 18, 2014

(51) Int. Cl.
- *A47J 31/057* (2006.01)
- *B67D 1/12* (2006.01)
- *A47J 31/40* (2006.01)
- *A47J 31/46* (2006.01)

(52) U.S. Cl.
CPC ............. *B67D 1/1252* (2013.01); *A47J 31/402* (2013.01); *A47J 31/46* (2013.01)

(58) Field of Classification Search
CPC ................................ A47J 31/402; A47J 31/46
USPC ............ 99/300, 280, 289 R, 302 R, 292, 299; 222/145.7
See application file for complete search history.

(56) References Cited

U.S. PATENT DOCUMENTS

| | | | |
|---|---|---|---|
| 4,015,626 A | 4/1977 | Thordarson | |
| 4,028,441 A | 6/1977 | Richards | |
| 4,098,285 A | 7/1978 | Karing | |
| 4,148,334 A | 4/1979 | Richards | |
| 4,250,915 A | 2/1981 | Rikuta | |
| 4,487,333 A | 12/1984 | Pounder et al. | |
| 4,520,953 A | 6/1985 | Fallon | |
| 4,779,761 A | 10/1988 | Rudick et al. | |
| 5,251,655 A | 10/1993 | Low | |
| 5,263,613 A | 11/1993 | Billings | |
| 5,566,732 A | 10/1996 | Nelson | |
| 5,878,654 A | 3/1999 | Kobayashi et al. | |
| 7,036,686 B2 | 5/2006 | Newton | |
| 7,077,290 B2 | 7/2006 | Bethuy et al. | |
| 7,861,740 B2 | 1/2011 | Phallen et al. | |
| 2004/0216514 A1* | 11/2004 | Nunnally et al. | 73/40 |
| 2005/0126401 A1* | 6/2005 | Streeter et al. | 99/279 |
| 2005/0274738 A1* | 12/2005 | Tomsic et al. | 222/129.4 |
| 2005/0279216 A1 | 12/2005 | Miller | |
| 2008/0092632 A1* | 4/2008 | Hoffmann et al. | 73/40.5 A |
| 2008/0282898 A1* | 11/2008 | Knepler | 99/285 |
| 2009/0136639 A1* | 5/2009 | Doglioni Majer | 426/431 |
| 2011/0017345 A1* | 1/2011 | Monzel | 141/1 |

FOREIGN PATENT DOCUMENTS

| | | |
|---|---|---|
| NL | 7904507 | 12/1980 |
| WO | WO 03/070073 A1 | 8/2003 |
| WO | WO 2007/110768 A2 | 10/2007 |
| WO | WO 2011151703 A2 * | 12/2011 |

OTHER PUBLICATIONS

International Search Report and Written Opinion for International Application No. PCT/US2014/020465 mailed Apr. 28, 2014.

* cited by examiner

*Primary Examiner* — Tu B Hoang
*Assistant Examiner* — Alba Rosario-Aponte
(74) *Attorney, Agent, or Firm* — Wolf, Greenfield & Sacks, P.C.

(57) ABSTRACT

Systems and methods for controlling liquid flow to the liquid supply of a beverage forming apparatus. The liquid supply may include two valves positioned in series for controlling a flow of a liquid into the liquid supply. Pressures upstream, between and/or downstream of the valves may be detected and used to determine if one or both of the valves leak when closed.

8 Claims, 2 Drawing Sheets

# MULTI-VALVE LIQUID FLOW CONTROL FOR LIQUID SUPPLY

FIELD

This invention relates to beverage forming systems, such as systems for carbonating liquids and/or mixing liquids with a beverage medium to form a beverage.

BACKGROUND

Beverage forming systems that use a liquid, such as water, to form a beverage are well known. Systems that use a valve to control a liquid supply are also known in the art. For example, U.S. Pat. No. 5,195,442 discloses a beverage brewing apparatus with a valve to control the supply of water to a heating tank.

SUMMARY

Aspects of the invention relate to methods and apparatus for controlling liquid flow to the liquid supply of a beverage forming apparatus. In one aspect of the invention, a beverage forming apparatus includes a beverage forming station arranged to combine a liquid with a beverage material to form a beverage, a liquid supply arranged to provide liquid to the beverage forming station for forming the beverage, and a control circuit. The liquid supply may have at least first and second valves positioned in series for controlling the flow of liquid from a liquid source to the liquid supply and a liquid conditioner configured to condition the liquid. The control circuit may control the at least first and second valves to open and close to control flow of liquid to the liquid supply.

In another aspect of the invention, a method of controlling a beverage forming apparatus includes controlling flow of pressurized liquid from a liquid source to a liquid supply of the beverage forming apparatus by controlling first and second valves. The first valve may be arranged in series with, and upstream of, the second valve and for fluid coupling to the liquid source.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

DETAILED DESCRIPTION

Beverage forming systems that use a liquid, such as water, to form a beverage are well known. Applicant has recognized that the valve used to control flow of a fluid from a liquid source to a liquid supply may leak and/or fail, causing unwanted and uncontrolled flow of liquid into the reservoir. Applicant has further recognized that by using at least two valves positioned in series to control the fluid flow, and by providing sensors to monitor these valves, various advantages may be realized.

Figure 1:
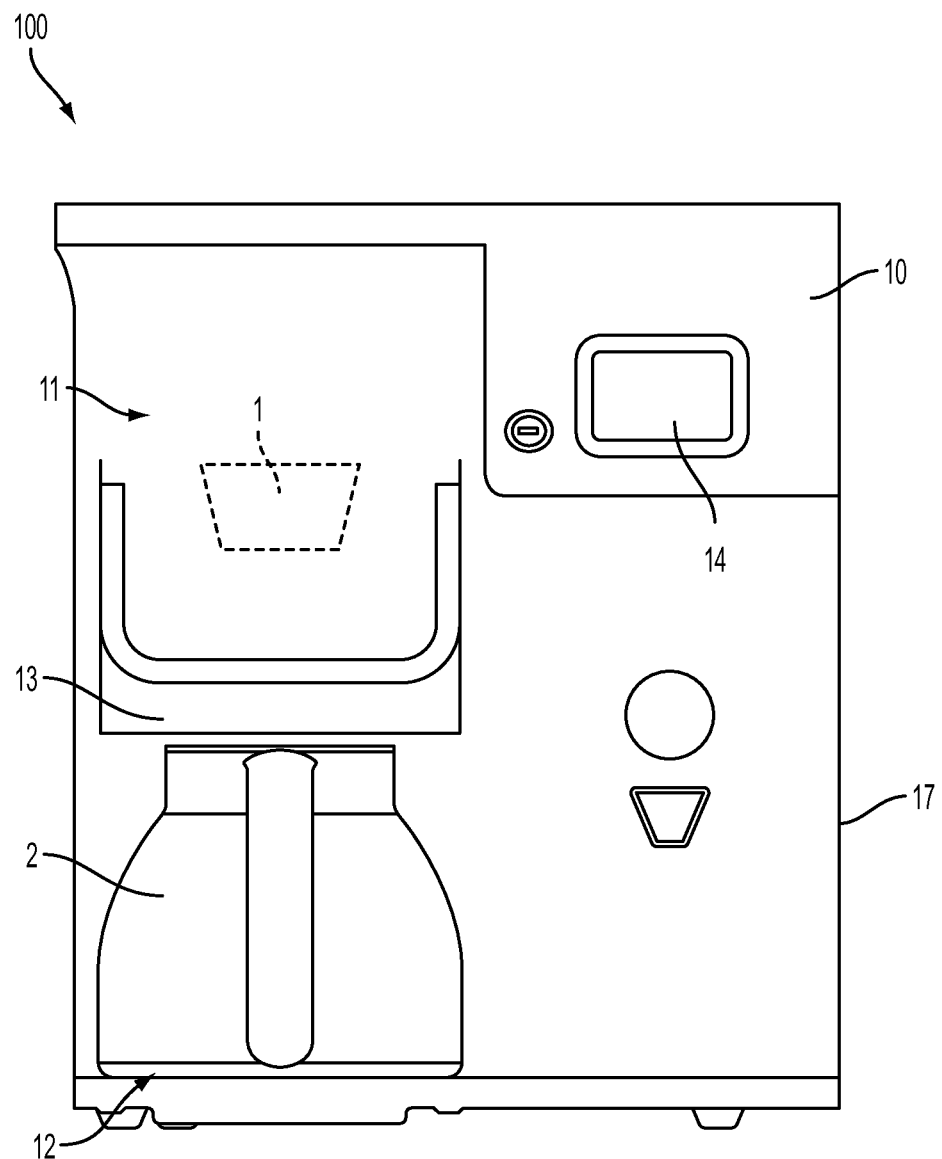
FIG. 1 is a perspective view of a beverage forming apparatus with a carafe located at a carafe receiving area of a beverage forming machine in an illustrative embodiment.

FIG. 1 shows a front view of a beverage forming apparatus 100 in an illustrative embodiment that incorporates aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 1 may be provided to the apparatus 100 and used to form a beverage that is deposited into a carafe 2. (As used herein, a carafe is any suitable container arranged to receive a dispensed beverage.) If used, the cartridge 1 may be manually or automatically placed in a beverage forming station 11 of a beverage forming machine 10. For example, the beverage forming station 11 may include a cartridge receiver that is exposed to receive the cartridge 1 when the user operates a handle or other actuator. With the cartridge 1 placed in the cartridge receiver, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage exits the cartridge 1, respectively. U.S. Pat. No. 8,361,527 describes a cartridge and a system for introducing liquid into the cartridge that may be used in an embodiment of this invention, and is hereby incorporated by reference in its entirety. Of course, aspects of the invention may be employed with any suitably arranged apparatus 100, including drip-type coffee brewers, carbonated beverage machines, and others arranged to form a beverage regardless of how the beverage is formed. For example, a cartridge 1 need not be used, and instead beverage material used to form a beverage may be provided to a mixing chamber or brew basket by a user or via a hopper system.

Figure 2:
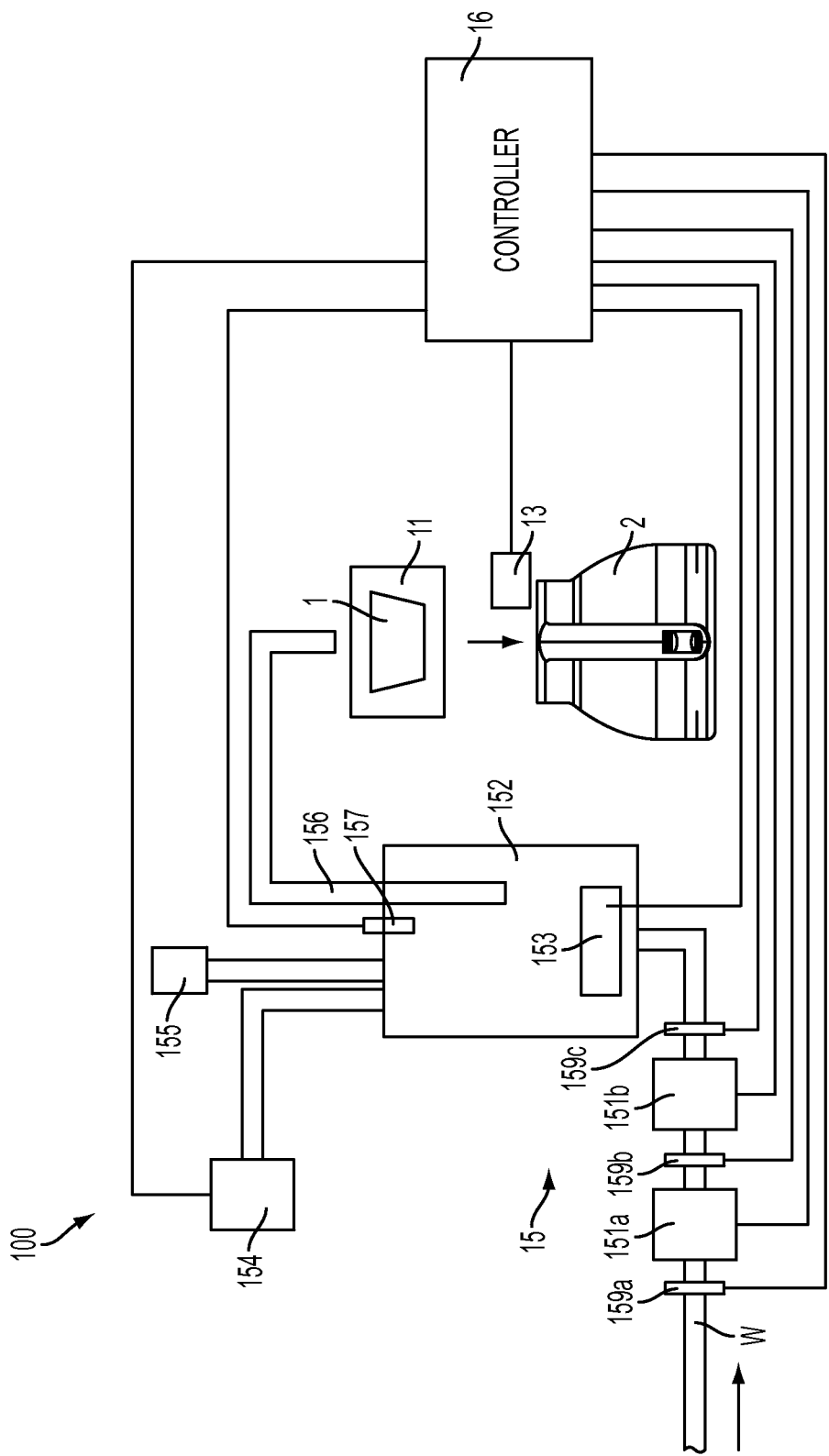
FIG. 2 is a schematic diagram of components of a beverage forming apparatus in an illustrative embodiment.

FIG. 2 shows a schematic block diagram of various components that may be included in the beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. Water or other precursor liquid may be provided by a liquid supply 15 to mix with a beverage material at a beverage forming station 11. The beverage material (such as coffee grounds, tea leaves, a powdered drink mix, etc.) may be provided in a cartridge 1, or not, and beverage produced by mixing the liquid with the beverage material may be dispensed into the carafe 2.

According to one aspect of the invention, the liquid supply may have at least first and second valves positioned in series for controlling flow of liquid from a liquid source to the liquid supply. Using the at least first and second valves positioned in series may reduce and/or eliminate unwanted fluid delivery to the liquid supply as this configuration creates valve redundancy, e.g., provides more than one valve to control liquid flow, and may allow for monitoring of the individual valves to detect valve leaks and/or other failures. In one embodiment, the first valve may be positioned upstream of the second valve and communicate with the second valve via an intermediate conduit. The liquid supply may be arranged to receive liquid from the liquid source under pressure such that opening the first and second valves allows liquid to flow into the liquid supply. Also, one or both valves may be closed to stop flow into the liquid supply.

For example, in the illustrative embodiment of FIG. 2, the liquid supply 15 includes first and second valves 151a, 151b that are coupled to a liquid source W, which provides liquid from a storage tank, a main water supply or other source. As noted above, the liquid source W may provide the liquid under pressure to the liquid supply. The first and second valves 151a, 151b may be positioned in series, with the first valve 151a positioned upstream of the second valve 151b and in fluid communication with the liquid source W. Although two valves 151a, 151b are shown in this embodiment, it should be appreciated that more than two valves may be used in other embodiments. The valves 151a, 151b may be controlled by a control circuit 16 to open and close to provide a desired volume of liquid to a tank 152. For example, if the tank 152 is empty, the valves 151a, 151b may be opened until a conductive probe or other water level sensor 157 provides a signal to the control circuit 16 that indicates when liquid arrives near or at a top of the tank 152 or other suitable level. In response to detecting liquid at the sensor 157, the control circuit 16 may close the valves 151a, 151b. As for opening the valves, the control circuit 16 may open the second valve 151b before the first valve 151a, may open the first valve 151a before the second valve 151b, or may open the valves simultaneously. Regarding valve closure, the control circuit 16 may close the second valve 151b before closing the first valve 151a, may close the first valve 151a before the second valve 151b, or may close the valves simultaneously. As discussed more below, the order in which the valves 151a, 151b are opened and/or closed, as well as the timing of such opening/closing, may depend upon whether the control circuit 16 uses a valve leak detection method, and if so, what method is used.

In some embodiments, the apparatus may be configured to monitor the valves to detect for leaks and/or other failures. For example, the apparatus may include a first sensor positioned upstream of the first valve to detect a characteristic of liquid upstream of the first valve, a second sensor positioned between the first and second valves to detect a characteristic of liquid in the intermediate conduit fluidly coupling the valves, and/or a third sensor positioned downstream of the second valve to detect a characteristic of liquid downstream of the second valve. The use of three sensors is not required for all embodiments, and instead only the first and second sensors may be used, only the second and third sensors may be used, etc. Each of the first, second, and third sensors may be configured to provide information regarding the respective detected characteristic the control circuit. For example, the first, second, and third sensors may detect a characteristic indicative of pressure of the liquid and provide a signal indicative of the detected pressure to the control circuit. In some embodiments, the control circuit may detect leaking of the first valve or the second valve by comparing pressures sensed by two or more of the sensors. For example, the control circuit may detect leakage of the first and/or second valve by determining if the pressure sensed by the first and second sensors are approximately equal or differ by a threshold value, or by determining whether a difference value between the pressures measured by the first and second sensors changes more than a threshold value over time.

As shown in FIG. 2, the fluid supply 15 in this embodiment includes sensors 159a, 159b, 159c, to monitor the first and second valves 151a, 151b. In this embodiment, a first sensor 159a is placed upstream of the first valve 151a to detect a characteristic indicative of pressure P1 of the fluid upstream of the first valve 151a, a second sensor 159b is placed between the first and second valves 151a, 151b to detect a characteristic indicative of pressure P2 of the fluid between the first and second valves 151a, 151b, and a third sensor 159c is placed downstream of the second valve 151b to detect the characteristic indicative of pressure P3 of the liquid downstream of the second valve 151b. Although three sensors are shown in this embodiment, one of skill in the art will appreciate that more or less sensors may be used in other embodiments. Each of the first, second, and third sensors 159a, 159b, 159c shown in this embodiment may provide a signal to the control circuit 16 regarding the characteristic P1, P2, P3 detected.

As noted above, which pressure measurements are compared and how they are compared may depend upon how the valves are controlled. For example, if the second valve 151b is closed before the first valve 151a, the pressure P2 of the liquid between the first and second valves 151a, 151b should be approximately equal to, or differ by some measured value, the pressure P1 of the liquid provided by the liquid source W. In one arrangement, a first difference value between the pressures P1 and P2 measured at a first time (such as immediately after valve closure), may be compared to a second difference value between the pressures P1 and P2 measured at a second, later time. If the difference values change by more than a threshold value, then valve leakage may be determined. Thus, if the control circuit 16 notes that the pressures P1 and P2 are equal immediately after valve closure (or differ by some amount), but then determines that the pressures P1 and P2 are later unequal (or differ by a greater value than before), the control circuit 16 may determine that the second valve 151b has been leaking. (It is assumed in this example that portions of the liquid supply 15 downstream of the second valve 151b are vented to atmospheric pressure.) Similarly, the control circuit may compare the pressures P2 and P3, both immediately after valve closure and at a later time, and if the pressures differ by a smaller value after time, leaking of the second valve 151b may be determined. On the other hand, if the second valve 151b is closed after the first valve 151a, the pressure P2 of the liquid between the first and second valves 151a, 151b should be approximately equal to, or differ by some measurable value, the pressure P3 downstream of the second valve 151b. Thus, if after a period of time the second and third sensors 159b, 159c detect more than a threshold change in the difference between the pressures P2, P3, a leak in the first valve 151a may be inferred. (A leak in the first valve 151a will raise the pressure P2 in the intermediate conduit relative to the pressure P3 downstream of the second valve 151b because in this embodiment the liquid supply W provides liquid under pressure.) Leakage of the first valve 151a may also be determined in the embodiment by determining whether the pressures P1 and P2 differ by a smaller value after the passage of time, e.g., leaking of the first valve 151a will tend to raise the pressure P2, bringing the pressure closer to pressure P1.

The control circuit 16 may take any suitable action in response to detecting a leaking valve. For example, the control circuit 16 may display a message, flash an indicator light, send an electronic message, disable system operation and/or take other action in response to detecting a leaking valve. The use of alerts may minimize or even prevent uncontrolled or undesired water delivery to the liquid supply 15 as the alerts may afford an operator the opportunity to power down the apparatus 100 and/or replace one or both of the first and second valves 151a, 151b. In some embodiments, the control circuit 16 alerts the operator by displaying a message on a user interface 14.

Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the control circuit 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valves 151a, 151b for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

In some embodiments, the liquid conditioner includes a tank for holding a liquid to be conditioned and the liquid supply includes a level sensor to detect a level of liquid in the tank. In some embodiments, the liquid conditioner includes a heater configured to heat the liquid, and the apparatus further includes an air pump arranged to pressurize the tank to force liquid in the tank to flow to the beverage forming station. As illustrated in FIG. 2, liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Again, liquid may be caused to flow from the tank 152 to the beverage forming station 11 in other ways, such as by opening the first or second valves 151a, 151b to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the liquid source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways. For example, the outlet of the heater tank 152 to the conduit 156 could be arranged at an extreme top of the tank 152, or in other ways. The conduit 156 may include a check valve or other flow controller, e.g., to help prevent backflow in the tank conduit 156 from the forming station 11.

In another aspect of the invention, a method of controlling a beverage forming apparatus includes controlling flow of pressurized liquid from a liquid source to a liquid supply of the beverage forming apparatus by controlling first and second valves. The first valve may be arranged in series with, and upstream of, the second valve and for fluid coupling to the liquid source, e.g., that provides liquid under pressure to the first valve. In one embodiment, the method includes providing first and second valves of a liquid supply arranged in series with the first valve upstream of the second valve, fluidly coupling the first valve to a liquid source that provides a pressurized source of a liquid, and controlling first and second valves to control flow of liquid from the liquid source to the liquid supply.

The first and second valves may be opened to allow flow of the pressurized liquid into a tank of the liquid supply, e.g., a heater or chilling tank. A liquid level in the tank may be detected and the first and second valves closed when the liquid level reaches a desired level in the tank. The tank may subsequently be pressurized with air to force liquid in the tank to flow to a beverage forming station of the beverage forming machine.

In some embodiments, the first and second valves may be opened to allow the flow of pressurized liquid into the liquid supply, and closed to stop flow of the pressurized liquid into the liquid supply. A first pressure may be detected in a flow path between the first and second valves, and a determination made that the first or second valve leaks closed based on the detected first pressure. For example, the first pressure may be compared to a second pressure measured upstream of the first valve or downstream of the second valve. In one embodiment, the second valve may be closed before the first valve, and the first pressure may be compared to a second pressure measured upstream of the first valve. Alternately, or additionally, the first valve may be closed before the second valve, and the first pressure compared to a second pressure measured downstream of the second valve. If a difference between the compared pressures changes by more than a threshold value over time, valve leakage may be determined. In one embodiment, an operator may be alerted if the first or second valve is determined to leak when closed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:
1. A beverage forming apparatus comprising:
 a beverage forming station arranged to combine a liquid with a beverage material to form a beverage;
 a liquid supply arranged to provide liquid to the beverage forming station for forming the beverage, the liquid supply having at least first and second valves positioned in series for controlling flow of liquid from a liquid source to the liquid supply, and a liquid conditioner configured to condition the liquid; and
 a control circuit arranged to control the at least first and second valves to open and close to control flow of liquid to the liquid supply;
 wherein the first and second valves are positioned upstream of the liquid conditioner when viewed along a direction of flow of liquid from the liquid source towards the liquid conditioner, the liquid conditioner arranged to at least one of heat, cool and carbonate the liquid;
 wherein the liquid supply is arranged to receive liquid from the liquid source under pressure such that opening of the first and second valves allows liquid to flow into the liquid supply;

wherein the control circuit includes a first sensor positioned between the first and second valves to detect a pressure of liquid in an intermediate conduit between the first and second valves, and a second sensor positioned downstream of the second valve to detect a pressure of liquid downstream of the second valve; and wherein the control circuit is arranged to detect that the first or second valve leaks when closed by comparing pressures sensed by the first and second sensors.

2. The apparatus of claim 1, wherein the first and second valves are electrically controllable.

3. The apparatus of claim 1, wherein the first valve is positioned upstream of the second valve and communicates with the second valve via the intermediate conduit, the apparatus further comprising a third sensor positioned upstream of the first valve to detect a pressure of liquid upstream of the first valve;

wherein each of the first, second, and third sensors are configured to provide information regarding the respective detected characteristic to the control circuit.

4. The apparatus of claim 1, wherein the liquid conditioner includes a tank for holding the liquid to be conditioned, and the liquid supply includes a level sensor to detect a level of liquid in the tank.

5. The apparatus of claim 4, wherein the liquid conditioner includes a heater configured to heat the liquid, the apparatus further comprising an air pump arranged to pressurize the tank to force liquid in the tank to flow to the beverage forming station.

6. The apparatus of claim 1, wherein the control circuit is arranged to provide an indication to an operator that the first or second valve leaks based on comparing pressures sensed by the first and second sensors.

7. The apparatus of claim 1, wherein the control circuit is arranged to detect if the first or second valve leaks when closed by determining if a difference between pressures sensed by the first and second sensors changes by more than a threshold value over time.

8. The apparatus of claim 3, wherein the control circuit is arranged to detect that the first or second valve leaks when closed by comparing pressures sensed by the first and third sensors.

* * * * *